US009611894B2

(12) United States Patent
Bigot et al.

(10) Patent No.: US 9,611,894 B2
(45) Date of Patent: *Apr. 4, 2017

(54) CLIP-FASTENED RACEWAY FOR A VARIABLE COMPRESSION RATIO ENGINE

(71) Applicants: MCE-5 DEVELOPMENT, Lyons (FR); Vianney Rabhi, Lyons (FR)

(72) Inventors: Sylvain Bigot, Ideron (FR); Philippe Dury, Villeurbanne (FR)

(73) Assignees: MCE-5 DEVELOPMENT, Lyons (FR); Vianney Rabhi, Lyons (FR)

( * ) Notice: Subject to any disclaimer, the term of this patent is extended or adjusted under 35 U.S.C. 154(b) by 1 day.

This patent is subject to a terminal disclaimer.

(21) Appl. No.: 14/972,154

(22) Filed: Dec. 17, 2015

(65) Prior Publication Data

US 2016/0102711 A1    Apr. 14, 2016

Related U.S. Application Data

(63) Continuation of application No. 13/717,918, filed on Dec. 18, 2012.

(Continued)

(51) Int. Cl.
| F02B 75/02 | (2006.01) |
| F16C 35/02 | (2006.01) |
| F16C 17/02 | (2006.01) |
| F02B 75/04 | (2006.01) |
| F01B 9/02 | (2006.01) |

(Continued)

(52) U.S. Cl.
CPC ............. *F16C 35/02* (2013.01); *F01B 9/02* (2013.01); *F01B 9/026* (2013.01); *F02B 75/04* (2013.01); *F02B 75/045* (2013.01); *F02B 75/048* (2013.01); *F16C 17/02* (2013.01); *F16C 33/60* (2013.01); *F16C 29/00* (2013.01); *F16C 2226/54* (2013.01); *F16C 2226/74* (2013.01)

(58) Field of Classification Search
USPC ... 123/48 A, 48 B, 48 C, 48 R, 197.3, 197.4, 123/311, 48 D, 78 E, 78 F, 78 R, 90.15, 123/202; 384/154
See application file for complete search history.

(56) References Cited

U.S. PATENT DOCUMENTS

| 2004/0168669 A1 | 9/2004 | Rabhi |
| 2010/0132671 A1 | 6/2010 | Cho et al. |
| 2011/0000451 A1 | 1/2011 | Kraus |

FOREIGN PATENT DOCUMENTS

| WO | 9851911 | 11/1998 |
| WO | 0031377 | 6/2000 |

(Continued)

*Primary Examiner* — Hung Q Nguyen
*Assistant Examiner* — Ruben Picon-Feliciano
(74) *Attorney, Agent, or Firm* — Young & Thompson

(57) ABSTRACT

A clip-fastened raceway for a variable compression ratio engine includes: at least one curved segment whose outer surface cooperates with a raceway housed in the transmission member or in the control member of the variable compression ratio engine and whose inner surface is maintained in contact with a curved outer surface housed in the toothed wheel of the engine; at least one clip, housed in at least one of the ends of the curved segment and fastened to one or the other of the ends of the curved outer surface housed in the toothed wheel and hooking onto a hook or protrusion which the wheel includes in the vicinity of the end of its curved outer surface, the hook or protrusion being complementary to that of the clip so as to be able to cooperate with the latter.

21 Claims, 6 Drawing Sheets

Related U.S. Application Data

(60) Provisional application No. 61/577,214, filed on Dec. 19, 2011.

(51) Int. Cl.
*F16C 33/60* (2006.01)
*F16C 29/00* (2006.01)

(56) References Cited

FOREIGN PATENT DOCUMENTS

| | | |
|---|---|---|
| WO | 03008783 | 1/2003 |
| WO | 2007085739 | 8/2007 |

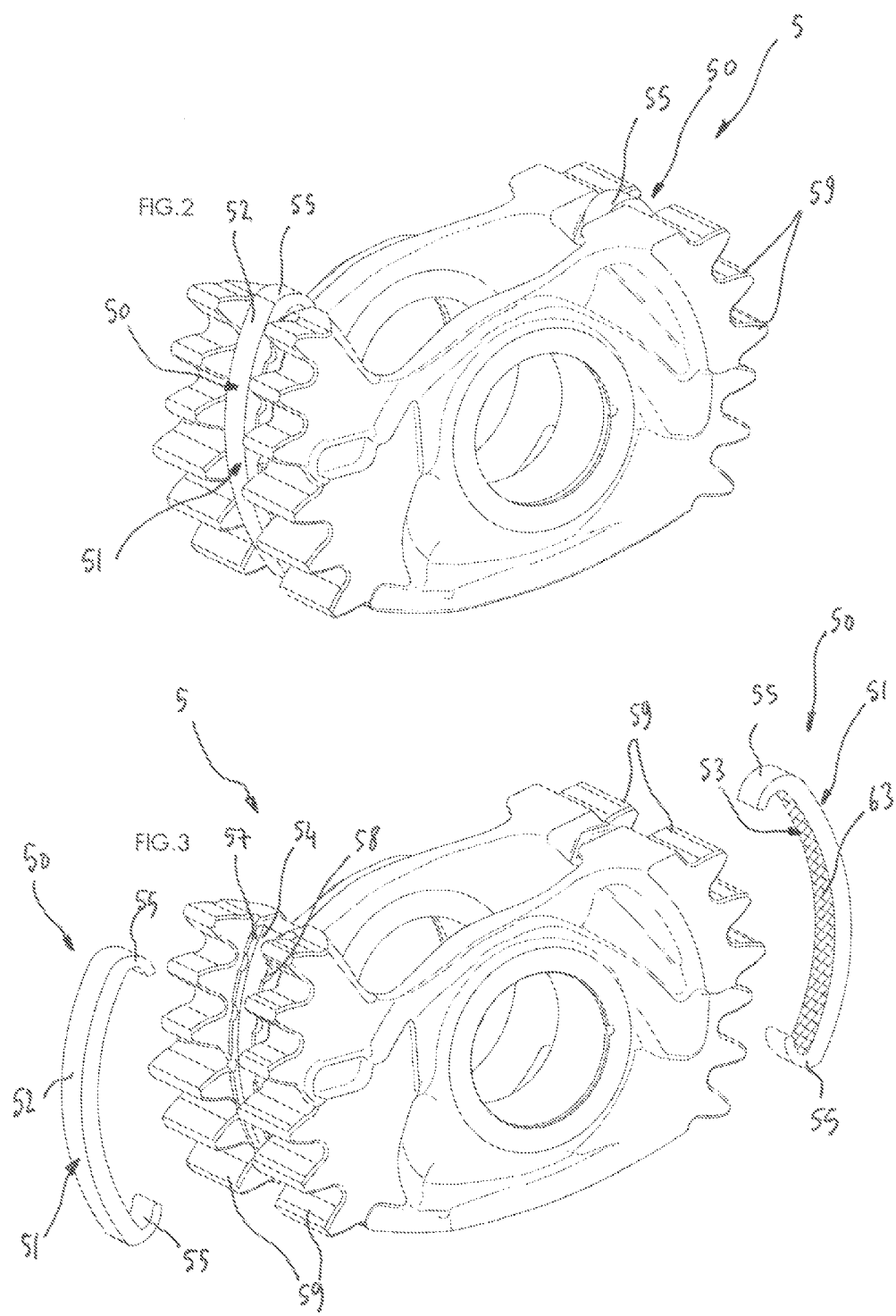

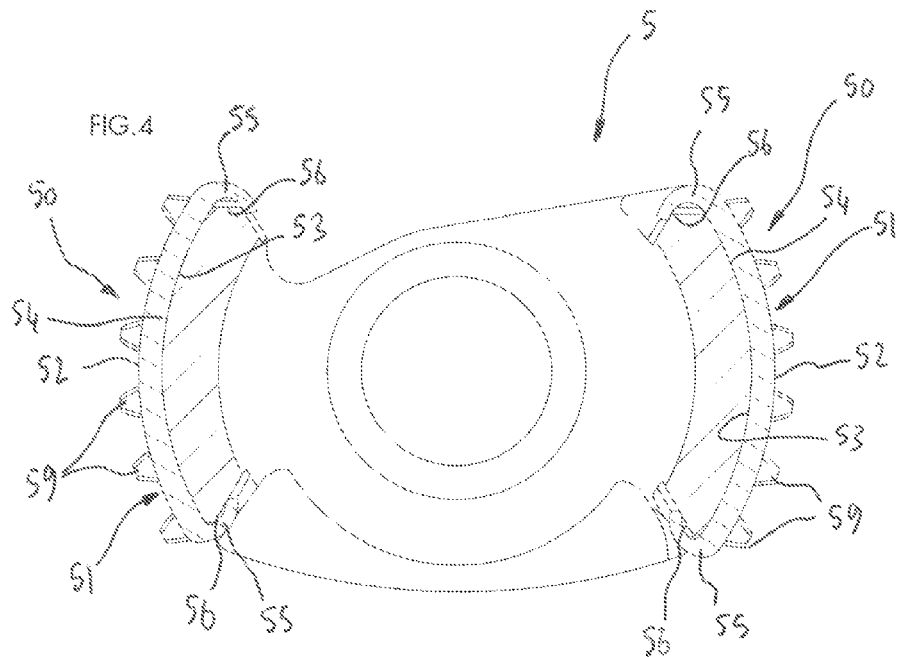
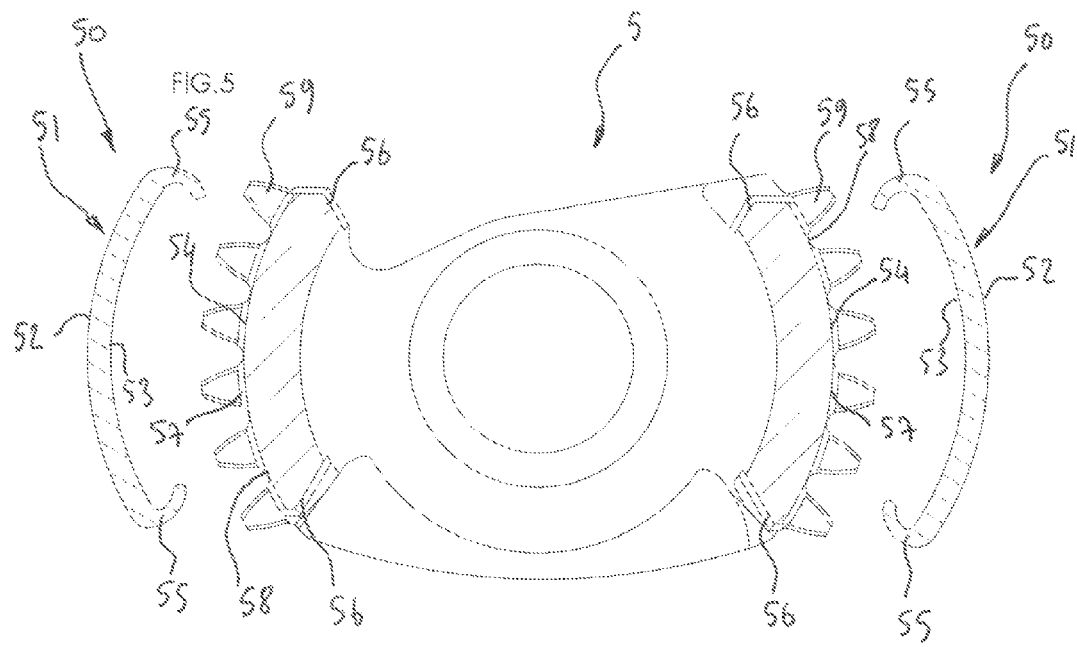

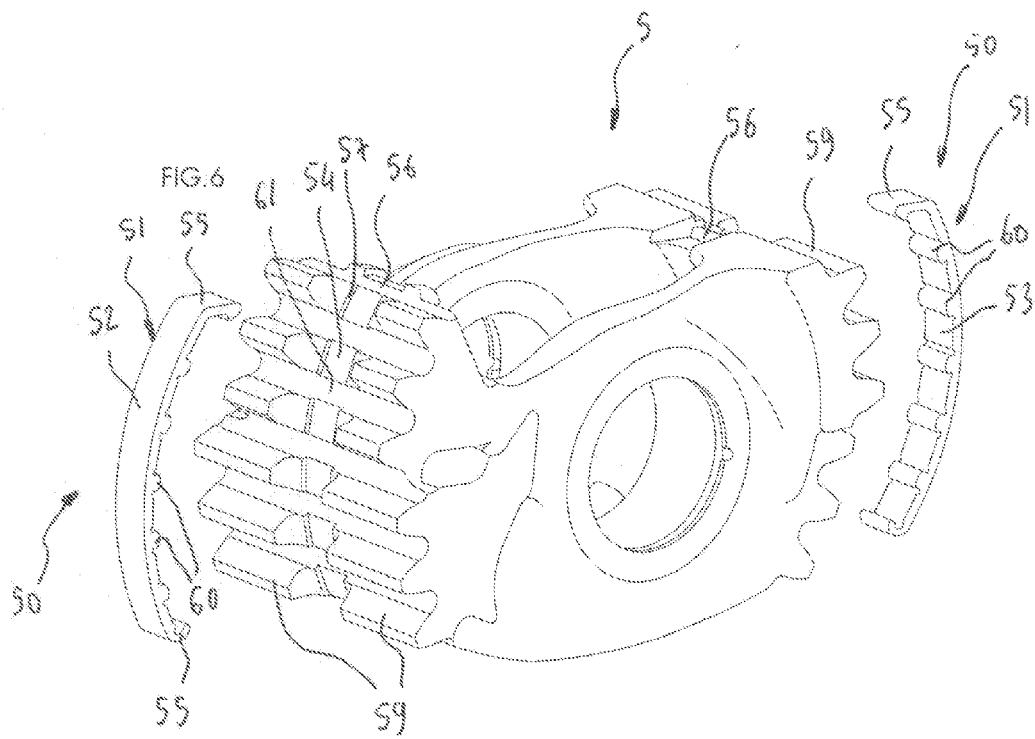
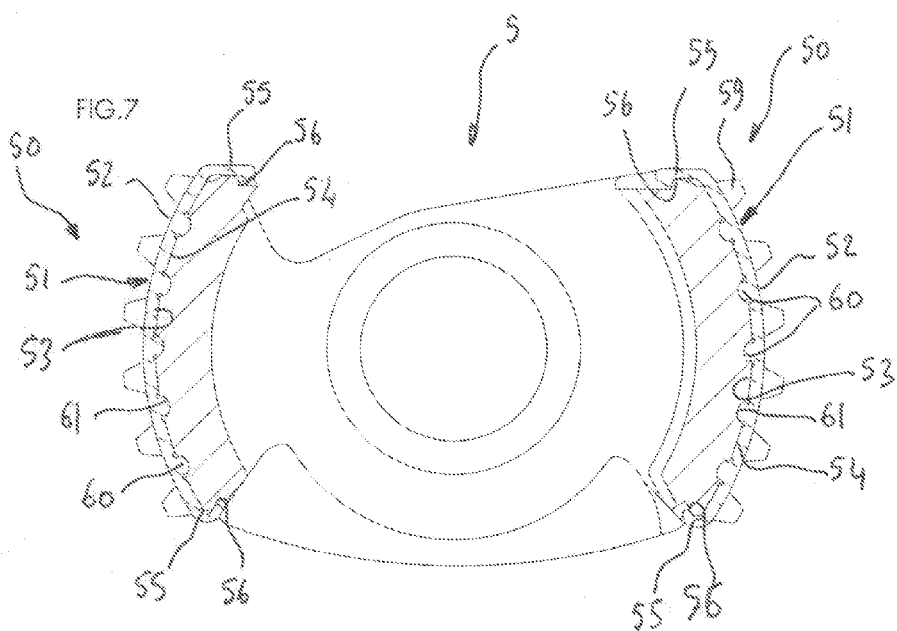

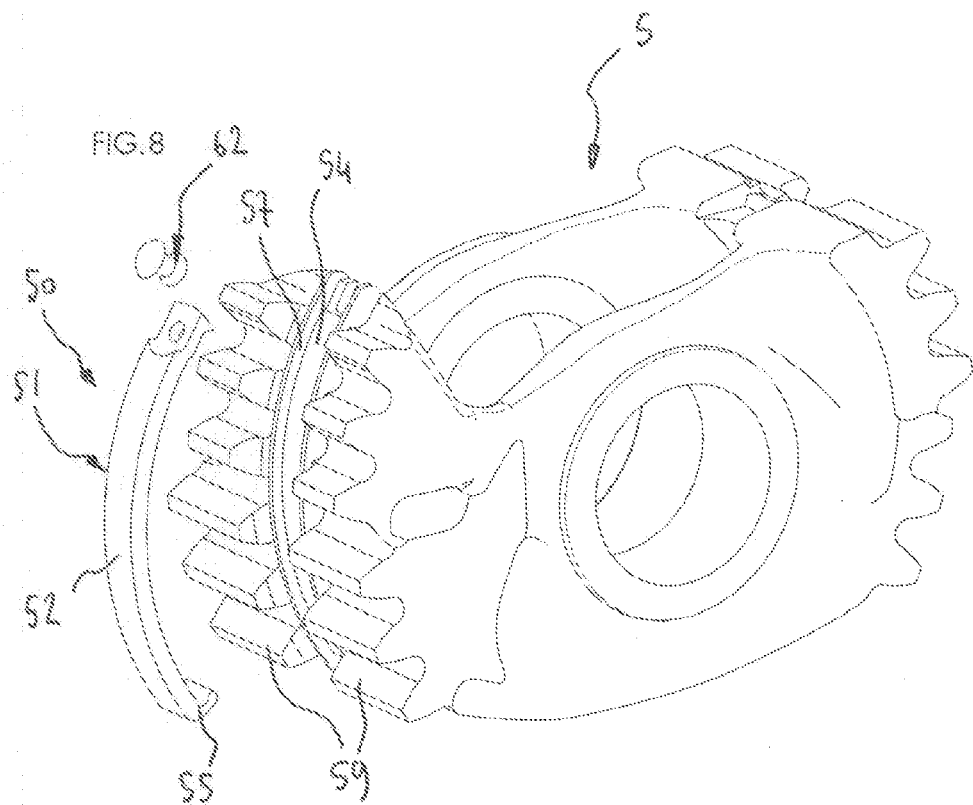
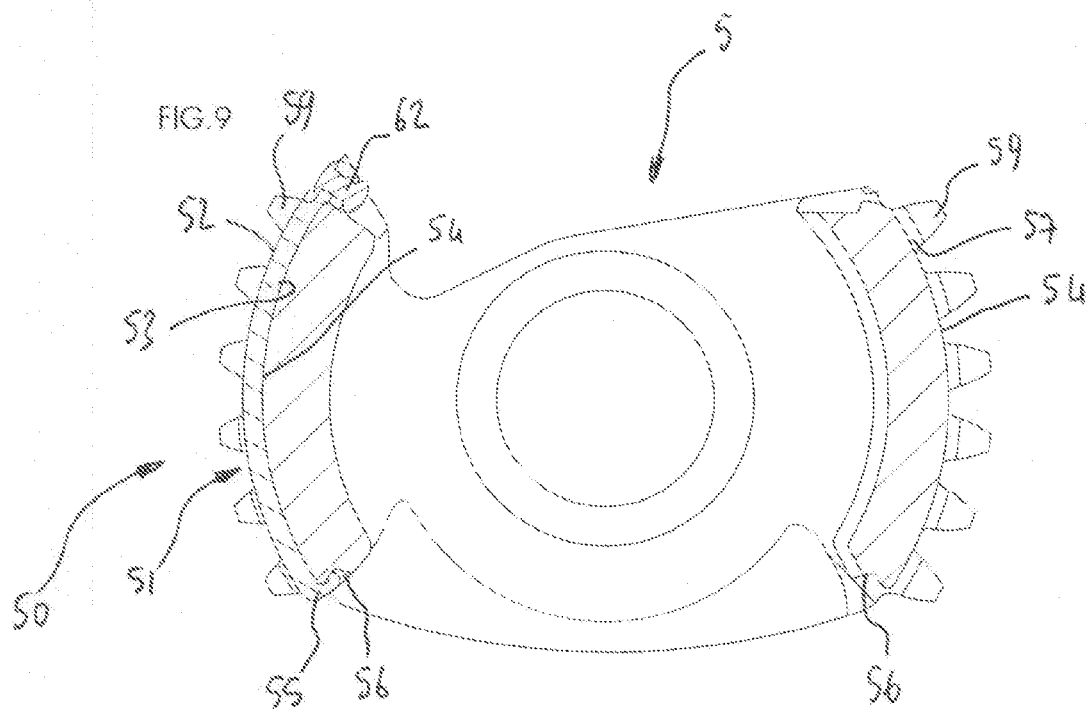

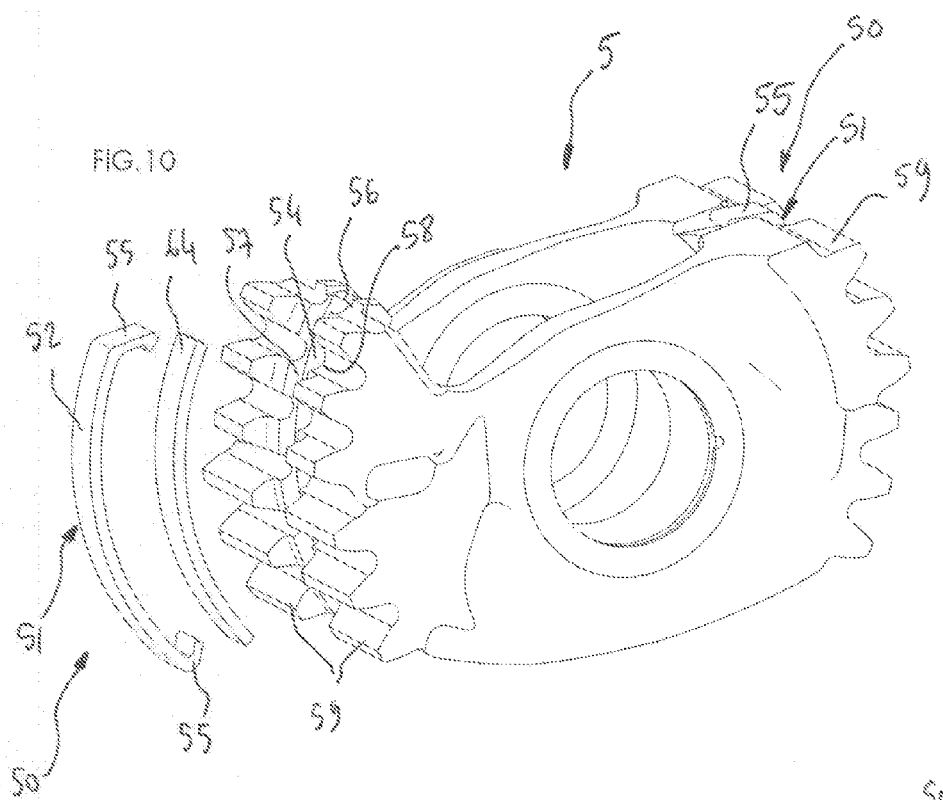
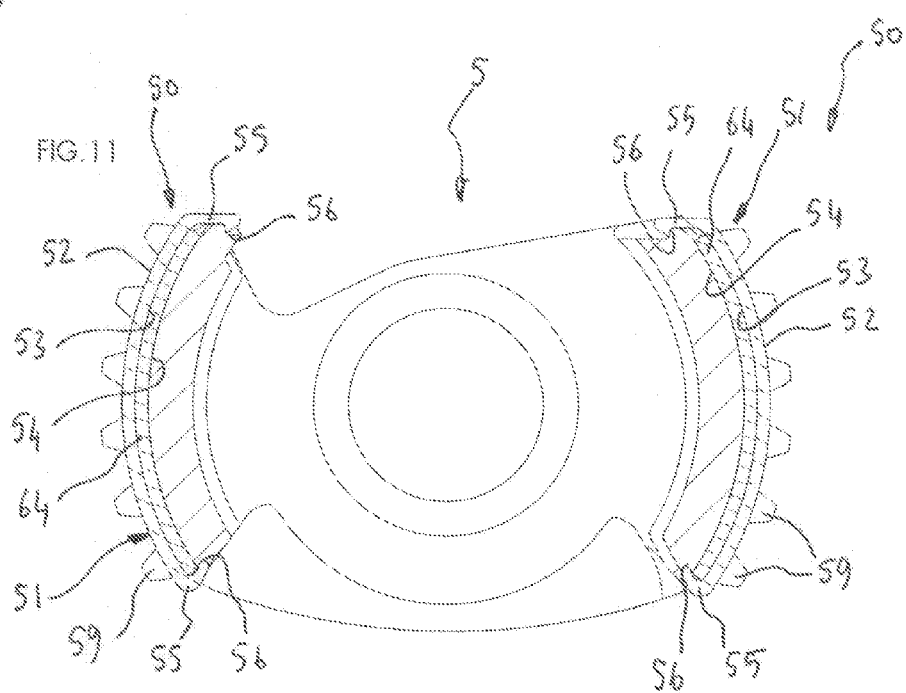

CLIP-FASTENED RACEWAY FOR A VARIABLE COMPRESSION RATIO ENGINE

BACKGROUND OF THE INVENTION

Field of the Invention

The present invention relates to a clip-fastened raceway for a variable compression ratio engine.

Description of the Related Art

International patents WO 98/51911, WO 00/31377, WO 03/008783, and WO 07/085739, belonging to the Applicant, disclose different mechanical devices for a variable volumetric ratio engine and/or a variable cylinder case.

It is observed that international patent WO 98/51911 describes a device which serves to improve the overall efficiency of internal combustion piston engines used at variable load and speed by adapting their effective displacement and/or their volumetric ratio during operation.

This type of engine is also known to one having ordinary skill in the art under the name "variable compression ratio engine". This term will be used hereinafter.

It is observed from international patent WO 00/31377, that the mechanical transmission device for a variable compression ratio engine comprises a piston which is affixed, in its lower portion, to a transmission member cooperating, on the one hand, with a rolling guide device, and on the other hand, with a toothed wheel affixed to a connecting rod, said wheel allowing movement to be transmitted between the piston and said connecting rod, the latter being articulated around a crank comprised by a crankshaft.

According to the same patent, it can be observed that the toothed wheel further cooperates with a control member whose adjustable vertical position with respect to the engine block, which the variable compression ratio engine comprises, allows for controlling the compression rate of said engine.

It is noted that, according to international patent WO 00/31377, the toothed wheel referred to as a "gear" in said patent comprises segments having a curved profile which are housed in a curved groove housed at mid-width of each toothed sector which said wheel comprises.

The term "runway strip" has thus been retained to designate said segments from international patent WO 03/008783, replaced by the term "raceway" in international patent WO 07/085739 relating to improvements or alternatives of the same variable compression ratio engine.

It is noted that the raceways comprised by the toothed wheel cooperate with other raceways which comprise, respectively, the transmission member and the control member, the contact point between the raceways and those of said members being positioned in the vicinity of the pitch circle of the gear assembly constituted of said wheel and said members so that said raceways define the center-to-center spacing of said gear, the operating clearance of which they control in the area of the teeth.

International patent WO 07/085739 also recalls that the minimum operating clearance between the teeth of the racks having large dimensions and those of the toothed wheel is determined by the location of the raceways comprised by said racks and wheel.

According to the same patent, during the operating of the variable compression ratio engine, the raceways of the racks and toothed wheel can be maintained in contact by means of a pressing device constituted of pressure means affixed to the cylinder housing of said engine, said means can in particular comprise a spring and/or a piston housed in a cylinder and subjected to a hydraulic pressure.

It is noted that, according to patent WO 03/008783, the raceways of the transmission and control members are made by machining the bodies which constitute said members. This particular configuration is made necessary by the need to rigidify said members, their rigidity being significantly reinforced when the raceways are integrated to the constitutive material of said members.

However, making said raceways and lateral sides which reinforce the rigidity of said members makes it impossible to use certain usual manufacturing methods for making gear teeth like a hob or a grinding wheel, these circular tools with a large diameter requiring the necessary clearance to operate.

Alternatively, it is for example possible to use precision forging stock of the large teeth of said members, then to high-speed machining or precision electro-chemical machining to finish the teeth and the raceways of said members.

It is noted that the precision electro-chemical machining makes it possible to finish said teeth of said transmission and control members after having cemented and soaked them with a precision on the order of several microns.

It is noted that these different patents do not, however, describe any mode for fastening raceways to the toothed wheel with the exception of international patent WO 00/31377 whose FIG. 6 shows raceways having dovetailed sections engaged in a groove having a complementary shape housed in the toothed wheel.

This solution was never experimented on since its implementation was deemed too complex and potentially would lead to various operational problems.

International patent WO 03/008783 indicates that the electron beam welding can be used as a mode for fastening said raceways on said wheel, this method being used to carry out various physical demonstrators of the variable compression ratio engine being the object of different patents cited in reference.

The main advantages of electron beam welding are that it is moderately complex to carry out, the cost is acceptable, and a low welding energy which limits the volume of thermal matter that is affected.

This low welding energy also limits the permanent set of the toothed wheel caused by welding, said permanent set affecting the geometric integrity and the operational performance of said wheel.

In spite of its advantages, the electron beam welding of the raceways on the toothed wheel presents the disadvantage of having insufficient resistance to fatigue, particularly when the variable compression ratio engine is used with heavy loads.

Various tests of said engine carried out by the Applicants of the present patent application have led to the partial or total unsoldering of the raceways fastened to the toothed wheel according to this method.

The breaks of said raceways subsequent to the unsoldering, accompanied, or not, with the total or partial detachment of said raceways from the toothed wheel, have led to the deterioration or even the destruction of said engine depending on whether said detached raceways or raceway portion are passed, all or in part, into the gear system of said engine.

In addition, the electron beam welding requires the raceway to be adequately flattened against the toothed wheel at the time of welding, without which said welding would be too strongly stressed during the operation of the variable compression ratio engine. In addition, electron beam welding requires the portion of the toothed wheel exposed to welding to be masked during the cementation phase, or an overthickness of the material to be removed by machining after cementation and before welding, in the welding zone to be provided.

Indeed, the electron beam welding is incompatible with a high carbon ratio of the steel constituting the toothed wheel or that constituting the raceway to be welded. The necessary masking is not well-adapted to the industrial production of said wheel since it is too complex and expensive.

As an alternative to electron beam welding, the possibility of securing the raceways onto said wheel by laser welding, friction welding, induction welding, brazing, or any other type of welding or fixed connection known to one having ordinary skill in the art, including any type of elastic fastener, was evaluated.

These more or less complex implementation methods have various drawbacks, and particularly those connected to the deformation of the pieces welded together or to an insufficient resistance to fatigue of the welding.

Other methods have also been envisioned to secure the raceways on the toothed wheel of the variable compression engine and particularly that which consists in making the toothed wheel by forged half-wheels, one of said half wheels directly integrating the raceways of said wheel at the time of forging, and the two half wheels being subsequently assembled to one another as claimed in international patent WO 03/008783, the description of which clearly indicates that the assembly of said two half wheels can be carried out, for example, by welding of any type, and particularly by electron beam or by laser, or by any brazing method, and particularly electromagnetic induction brazing.

The latter method, consisting in one of the half wheels carrying raceways integrated to its material, provides excellent hold for said raceways on the toothed wheel.

In addition, said method excludes any problem of flattening said raceways onto said wheel necessary at the time of welding said raceways onto said wheel since there is no longer any welding, but also during the grinding of said raceways once mounted on said wheel, or when the variable compression ratio engine is operating.

To the contrary, the principle of the half wheel carrying the raceways integrated to its material present the drawback of limiting the fabrication methods usable to finish the teeth of the toothed wheel because the presence of said raceways on said wheel very early on the machining range excludes the use of a wheel or milling or grinding cutter to finish said teeth.

Alternatively, a cutting by means of a knife and a shaving wheel finishing can be used, these two methods being in theory cheaper and less precise than the more conventional gear machining tools.

In addition, the material used for the raceways cannot be different from that used to make the toothed wheel since said raceways are made from the same piece of material than said wheel, which does not allow for optimizing it as a function of the specific needs adapted to said raceways.

It is the same for surface treatment and thermal treatment of said raceways which can hardly be different from those of the toothed wheel, said raceways being definitely affixed to said wheel.

Another method can consist of decreasing the outer diameter of the raceways of the toothed wheel so that said diameter is substantially less than the diameter at the bases of the teeth comprised by said wheel.

This method simultaneously allows the integration of said raceways in the material of the toothed wheel and the use of a cutting or grinding wheel to make the teeth of said wheel.

The drawback of this method is that it moves the pitch circle of said gear system away from the contact surface of the different raceways which said system comprises.

This moving away introduces an important gliding component in the rolling area operated at the contact point between the different raceways of said system, said component leading to an increase of the energy dissipated by friction by said system, and said increase diminishing the mechanical efficiency of the variable compression ratio engine.

SUMMARY OF THE INVENTION

It is to solve these problems that the clip-fastened raceway for a variable compression ratio engine according to the invention is provided to:
- be mounted on the toothed wheel once the latter has been entirely finished;
- not require any welding for its fastening onto the toothed wheel, and, as such, eliminate any risk of thermal deformation or alteration of the mechanical characteristics of said wheel;
- render usable any hob and grinding wheel machining process to cut and finish the teeth of the toothed wheel;
- be dismountable and remountable if necessary;
- be robust and ensure the long lasting operation of the variable compression ratio engine over a period covering at least the lifespan of a vehicle with no risk of separation of the raceway of said toothed wheel;
- be, if necessary, made in a different material than that of the toothed wheel, and to receive a surface treatment and a thermal treatment different than those of said wheel;
- remain perfectly flattened against the toothed wheel so that its diameter remains as constant as possible no matter the load of the variable compression ratio engine;
- ensure a contact point between the different raceways of the gear assembly, positioned as close as possible to the pitch circle of said assembly;
- be economically advantageous because of the simplicity of the methods and processes required for its fabrication and mounting.

Thus, the clip-fastened raceway for a variable compression ratio engine according to the present invention comprises:
- at least one curved segment whose outer surface cooperates with a raceway housed in the transmission member or in the member for controlling the variable compression ratio engine and whose inner surface is maintained in contact with a curved outer surface housed in the toothed wheel of said engine;
- at least one clip, housed in at least one of the ends of the curved segment and fastened to one or the other of the ends of the curved outer surface housed in the toothed wheel and hooking onto a hook or protrusion which said wheel comprises in the vicinity of said end of its curved outer surface, said hook or protrusion being complementary to that of the clip so as to be able to cooperate with the latter.

The clip-fastened raceway according to the present invention comprises a curved segment which is maintained laterally on the curved outer surface housed in the toothed wheel by at least one lateral stop abutment which prevents said segment from moving parallel to its axis of curvature.

The clip-fastened raceway according to the present invention comprises a curved segment whose lateral stop abutment is constituted of at least one edge housed in at least one side of the curved outer surface housed in the toothed wheel.

The clip-fastened raceway according to the present invention comprises a curved segment whose edge housed in at least one side of the curved outer surface comprised by the toothed wheel comprises recesses in the area of the bottom of the teeth which the toothed wheel comprises.

The clip-fastened raceway according to the present invention comprises a curved segment whose inner surface comprises longitudinal and/or lateral stop pins which cooperate by nesting with pins or grooves having a reverse relief which the curved outer surface housed in the toothed wheel comprises.

The clip-fastened raceway according to the present invention comprises a curved segment, at least one of the ends of which is fastened to the toothed wheel by means of a mechanical anchoring connection.

The clip-fastened raceway according to the present invention comprises a curved segment whose inner surface and/or curved outer surface housed in the toothed wheel comprises raised and/or recessed geometric patterns which allows the lubricating oil comprised by the casing of the variable compression ratio engine to circulate between said inner surface and said curved outer surface.

The clip-fastened raceway according to the invention comprises a curved segment cooperating with a shim between said segment and the curved outer surface housed in the toothed wheel.

The clip-fastened raceway according to the invention comprises a curved segment which is longitudinally maintained on the curved outer surface housed in the toothed wheel by at least one longitudinal stop abutment which prevents said segment from rotating about its axis of curvature.

BRIEF DESCRIPTION OF THE DRAWING FIGURES

The description that follows of the accompanying annexed drawings given by way of non-limiting examples will allow to be better understand the invention, the characteristics which it presents and the advantages which it can provide:

FIGS. 2 and 3 are perspective views of the clip-fastened raceway according to the present invention and of the toothed wheel onto which it is mounted, respectively mounted and dismounted, of said toothed wheel which the variable compression ratio engine comprises.

FIGS. 4 and 5 are cross-sectional lateral views of the clip-fastened raceway according to the present invention and of the toothed wheel onto which it is mounted, respectively mounted and dismounted, of said toothed wheel which the variable compression ratio engine comprises.

Figure 1:
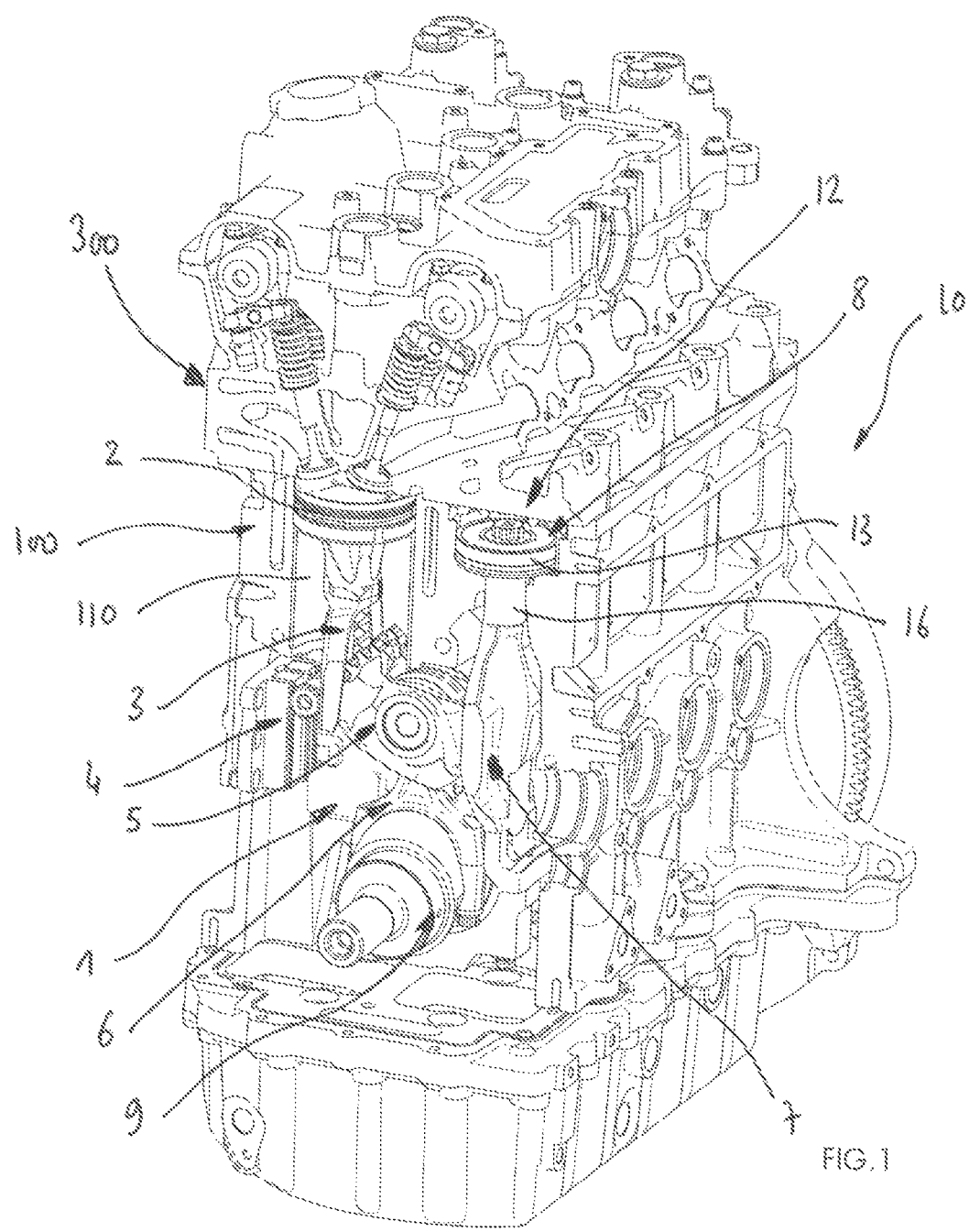
FIG. 1 shows a variable compression ratio engine which comprises the clip-fastened raceway according to the invention.

FIGS. 6 and 7 are exploded and lateral cross-section perspective views, respectively, of the clip-fastened raceway according to the present invention and of the toothed wheel onto which it is mounted, when the inner surface of the curved segment comprises longitudinal and/or lateral stop pins which cooperate by nesting with pins or grooves having a reversed relief which the curved outer surface housed in the toothed wheel comprises.

FIGS. 8 and 9 are exploded and lateral cross-section perspective views, respectively, of the clip-fastened raceway according to the present invention and of the toothed wheel onto which it is mounted, showing one of the ends of the curved segment which is fastened to the toothed wheel by means of a mechanical anchoring connection.

FIGS. 10 and 11 are exploded and lateral cross-section perspective views, respectively, of the clip-fastened raceway according to the present invention and of the toothed wheel according to an alternative which provides for the curved segment to cooperate with a shim sandwiched between said segment and the curved outer surface housed in the toothed wheel.

FIG. 1 shows an engine block or cylinder case 100 which comprises at least one cylinder 110 in which moves a combustion piston 2 by means of a transmission device 1 and pressure means which allow the main mobile components of a variable compression ratio engine 10 to be maintained in position.

The mechanical transmission device 1 comprises in the lower portion of the combustion piston 2 a transmission member 3 affixed to said piston and cooperating, on the one hand with a rolling guide device 4, and on the other hand, with a toothed wheel 5.

DETAILED DESCRIPTION OF THE INVENTION

The toothed wheel 5 cooperates with a connecting rod 6 connected to a crankshaft 9 in order to perform the transmission of the movement between the combustion piston 2 and said connecting rod 6.

The toothed wheel 5 cooperates opposite the transmission member or piston gear rack 3 with a control member or rack referred to as control rack 7 whose vertical position relative to the cylinder case 100 is controlled by a control device 12 comprising a control actuator 8 whose actuator piston 13 is guided in a cylinder of an actuator housed in the cylinder case 100 and closed in its upper portion by a common cylinder head 300.

The hydraulic double-acting control actuator 8 comprises above the actuator piston 13 an upper chamber of the actuator and below the piston of said actuator 13 a lower chamber of the actuator, said chambers having a displacement different from one another for the same stroke of the actuator 13.

The hydraulic double-acting control actuator 8 is constituted of a lower rod of the actuator 16 affixed to the control rack 7 and a tightening screw provided with a closing head housed in the upper chamber of the actuator and allowing for the actuator piston 13 to be fastened to said lower rod of the actuator 16 of the control rack 7.

FIGS. 2 to 5 show a toothed wheel 5 comprising at least one raceway 50 which is constituted of at least one curved segment 51 comprising an outer surface 52 which cooperates with a raceway, not shown, housed in the transmission member 3 or in the control member 7 of the variable compression ratio engine 10.

The curved segment 51 comprises an inner surface 53 which is maintained in contact with a curved outer surface 54 housed in the toothed wheel 5 of the variable compression ratio engine 10.

The outer 52 and/or inner 53 surface of said curved segment 51 can be flat, arched, or have a complex profile in the direction parallel or perpendicular to the axis of curvature of said segment.

The outer 52 and/or inner 53 surface of said curved segment 51 can be cemented, nitrided, or treated according to any method known to one having ordinary skill in the art, and particularly coated with a layer of hard material such as, for example, amorphous carbon of the DLC type (Diamond Like Coating), said treatments and/or coatings intended to increase the mechanical resistance to fatigue and/or wear of said outer 52 and/or inner 53 surfaces.

The toothed wheel 5 comprises at least one raceway 50 which is constituted of at least one clip 55, housed in at least one of the ends of the curved segment 51.

The clip 55 is fastened to one or the other of the ends of the curved outer surface 54 housed in said toothed wheel 5 by hooking onto a hook or protrusion 56 which said wheel 5 comprises in the vicinity of said end of its curved outer surface 54, said hook shape or protrusion 56 being complementary to that of the clip 55 so as to cooperate with the latter.

The raceway 50 comprises a curved segment which is laterally maintained on the curved outer surface 54 housed in the toothed wheel 5 by at least one lateral stop abutment constituted of at least one edge 57 which prevents said segment 51 from moving in parallel to its axis of curvature.

Each edge 57 of the lateral stop abutment is housed in at least on side of the curved outer surface 54 which the toothed wheel 5 comprises.

Each edge 57 comprises recesses 58 in the area of the bases of the teeth 59 which the toothed wheel 5 comprises.

The recesses 58 make it possible, in particular, to allow passage of a cutting or grinding wheel during the machining of said teeth 59, or are made following the passage of said cutting or grinding wheel.

The inner surface 53 of the curved segment 51 comprises longitudinal and/or lateral stop pins 60 which cooperate by nesting with pins or grooves 61 having a reversed relief which the curved outer surface 54 housed in the toothed wheel 5 comprises (FIGS. 6 and 7).

The stop pins 60 which said curved segment 51 comprises and/or the pins or grooves 61 which said curved outer surface 54 comprises make it possible to support said curved segment 51 during the operation of the variable compression ratio engine 10, while preventing any creeping phenomenon which would lead said curved segment 51 to be displaced along its length with respect to said curved outer surface 54.

At least one of the ends of the curved segment 51 of the raceway 50 can be fastened to the toothed wheel 5 by means of a mechanical anchoring connector 62 which may be, for example, according to a particular embodiment, a rivet, a screw, a peg, or any other fastening means known to one having ordinary skill in the art (FIGS. 8 and 9).

The raceway 50 comprises, on the inner surface 53 of the curved segment 51 and/or on the curved outer surface 54 housed in the toothed wheel 5, geometric patterns, raised or hollow 63 which allow the lubricating oil which the casing of the variable compression ratio engine 10 comprises to circulate between said inner surface 53 and said curved outer surface 54 (FIG. 3).

FIGS. 10 and 11 show the raceway 50 whose curved segment 51 cooperates with a shim 64 which is sandwiched between said segment and the curved outer surface 54 housed in the toothed wheel 5.

Said shim 64 makes it possible, in particular, to adjust the rigidity of said curved segment 51 by adjusting the thickness, the sum of the thicknesses of said shim and of said segment being provided for positioning the contact surface between said segment and the raceway housed in the transmission member 3 or in the control member 7 in the vicinity of the pitch circle of the gear which the toothed wheel 5 and said members 3 and 7 constitute.

It is noted that the shim 64 can be constituted of a material, different from that of the raceway 50 or of the toothed wheel 5. According to an alternative embodiment, said shim can also be glued either on the inner surface 53 of the raceway 50 or on the curved outer surface 54 of the toothed wheel 5, or on both.

The curved segment 51 of the raceway 50 is maintained longitudinally on the curved outer surface 54 housed in the toothed wheel 5 by at least one longitudinal stop abutment, not shown, which prevents said segment from rotating about its axis of curvature.

Said longitudinal stop abutment can be, for example, constituted of a cylindrical stop pin housed, on the one hand, in said curved segment 51, and on the other hand, in the toothed wheel 5.

From the aforementioned description, it is to be understood how the raceway 50 is mounted according to the invention on the toothed wheel 5 of the variable compression ratio engine 10, for example in relation to FIGS. 4 and 5.

A first clip 55 housed at a first end of the curved segment 51 constituting the raceway 50 according to the invention is hooked onto a first hook 56 which the toothed wheel 5 comprises in the vicinity of a first end of its curved outer surface 54, then said segment 51 is biased in extension in its elasticity until a second clip 55 housed in its second end hooks itself on the opposite hook 56 made in the vicinity of the second end of the curved outer surface 54 of said wheel 5.

Once this assembly has been performed, said raceway 50 can be grinded directly on said toothed wheel 5 so the outer diameter of said raceway 50 can be adjusted until the clearance sought between the teeth 59 of said wheel 5 and the transmission 3, 5 and control 7 members with which it cooperates has been obtained.

It is noted that it is possible to prepare raceways 50 of different thicknesses that can be matched with the toothed wheel 5 so as to adjust the clearance at the teeth of the gear system constituted of said wheel and transmission 3 and control 7 members without having to grind said raceways after they have been mounted on said wheel, the thickness of the raceways to be matched with the toothed wheel 5 being determined by the measured thickness of the teeth of said wheel.

It must be understood that the aforementioned description has been given only by way of example and that it does not limit the field of the invention, the scope of which would not be left by replacing the details of execution described by any other equivalent.

The invention claimed is:

1. A clip-fastened raceway for a variable compression ratio engine, said engine comprising a cylinder case receiving a transmission member provided with a rack, to which are fastened a combustion piston, a control member provided with a rack and connected to a hydraulic double-acting control actuator, a toothed wheel which cooperates with the transmission member, and with the control member to transmit the mechanical work produced by the combustion on the combustion piston by a connecting rod connected to a crankshaft, the raceway comprising:

at least one curved segment having an outer surface which cooperates with a raceway housed in the transmission member or in the control member of the variable compression ratio engine, the curved segment having an inner surface which is maintained in contact with a curved outer surface housed in the toothed wheel of said engine;

at least one clip, housed in at least one end of the curved segment and fastened to one or other of ends of the curved outer surface housed in the toothed wheel and hooking onto a hook or protrusion which said wheel comprises in a vicinity of said end of the curved outer surface, said hook or protrusion being complementary to the at least one clip so as to be able to cooperate with the at least one clip.

2. The clip-fastened raceway for a variable compression ratio engine according to claim 1, wherein the curved segment is laterally maintained on the curved outer surface housed in the toothed wheel by at least one lateral stop abutment which prevents said segment from moving parallel to an axis of curvature of said segment.

3. The clip-fastened raceway for a variable compression ratio engine according to claim 2, wherein the lateral stop abutment is constituted of at least one edge housed in at least one side of the curved outer surface of the toothed wheel.

4. The clip-fastened for a variable compression ratio engine according to claim 3, wherein the edge housed in at least one side of the curved outer surface of the toothed wheel comprises recesses in an area of bases of the teeth which the toothed wheel comprises.

5. The clip-fastened raceway for a variable compression ratio engine according to claim 1, wherein the inner surface of the curved segment comprises longitudinal and/or lateral stop pins which cooperate by nesting with pins or grooves having a reverse relief which the curved outer surface housed in the toothed wheel comprises.

6. The clip-fastened raceway for a variable compression ratio engine according to claim 1, wherein at least one of the ends of the curved segment is fastened to the toothed wheel by a mechanical anchoring connection.

7. The clip-fastened raceway for a variable compression ratio engine according to claim 1, wherein the inner surface of the curved segment and/or the curved outer surface housed in the toothed wheel comprises raised or recessed geometric patterns which allow lubricating oil from a casing of the variable compression ratio engine to circulate between said inner surface and said curved outer surface.

8. The clip-fastened raceway for a variable compression ratio engine according to claim 1, wherein the curved segment cooperates with a shim sandwiched between said segment and the curved outer surface housed in the toothed wheel.

9. The clip-fastened raceway for a variable compression ratio engine according to claim 1, wherein the curved segment is longitudinally maintained on the curved outer surface housed in the toothed wheel by at least one longitudinal stop abutment which prevents said segment from rotating about its axis of curvature.

10. A clip-fastened raceway for a variable compression ratio engine, comprising:
at least one curved segment having an outer surface which cooperates with a raceway housed in a transmission member or in a control member of the variable compression ratio engine, the curved segment having an inner surface which is maintained in contact with a curved outer surface housed in a toothed wheel of said engine;
at least one clip, housed in at least one end of the curved segment and fastened to one or other of ends of the curved outer surface housed in the toothed wheel and hooking onto a hook or protrusion which said wheel comprises in a vicinity of said end of the curved outer surface, said hook or protrusion being complementary to the at least one clip so as to be able to cooperate with the at least one clip.

11. The clip-fastened raceway for a variable compression ratio engine according to claim 10, wherein the curved segment is laterally maintained on the curved outer surface housed in the toothed wheel by at least one lateral stop abutment which prevents said segment from moving parallel to an axis of curvature of said segment.

12. The clip-fastened raceway for a variable compression ratio engine according to claim 11, wherein the lateral stop abutment is constituted of at least one edge housed in at least one side of the curved outer surface of the toothed wheel.

13. The clip-fastened for a variable compression ratio engine according to claim 12, wherein the edge housed in at least one side of the curved outer surface of the toothed wheel comprises recesses in an area of bases of the teeth which the toothed wheel comprises.

14. The clip-fastened raceway for a variable compression ratio engine according to claim 10, wherein the inner surface of the curved segment comprises longitudinal and/or lateral stop pins which cooperate by nesting with pins or grooves having a reverse relief which the curved outer surface housed in the toothed wheel comprises.

15. The clip-fastened raceway for a variable compression ratio engine according to claim 10, wherein at least one of the ends of the curved segment is fastened to the toothed wheel by a mechanical anchoring connection.

16. The clip-fastened raceway for a variable compression ratio engine according to claim 10, wherein the inner surface of the curved segment and/or the curved outer surface housed in the toothed wheel comprises raised or recessed geometric patterns which allow lubricating oil from a casing of the variable compression ratio engine to circulate between said inner surface and said curved outer surface.

17. The clip-fastened raceway for a variable compression ratio engine according to claim 10, wherein the curved segment cooperates with a shim sandwiched between said segment and the curved outer surface housed in the toothed wheel.

18. The clip-fastened raceway for a variable compression ratio engine according to claim 10, wherein the curved segment is longitudinally maintained on the curved outer surface housed in the toothed wheel by at least one longitudinal stop abutment which prevents said segment from rotating about its axis of curvature.

19. The clip-fastened raceway for a variable compression ratio engine according to claim 10, wherein the variable compression ratio engine comprises:
a cylinder case receiving the transmission member provided with a rack, to which are fastened a combustion piston;
a control member provided with a rack and connected to a hydraulic double-acting control actuator; and
the toothed wheel which cooperates with the transmission member, and with a control member to transmit the mechanical work produced by combustion on the combustion piston by a connecting rod connected to a crankshaft.

20. The clip-fastened raceway for a variable compression ratio engine according to claim 1, further comprising a shim sandwiched between said curved segment and the curved outer surface, the shim being configured to adjust a rigidity of the curved segment by adjusting a thickness of the shim.

21. A clip-fastened raceway for a variable compression ratio engine, comprising:
at least one curved segment having an outer surface which cooperates with a raceway housed in a transmission member or in a control member of the variable compression ratio engine, the curved segment having an inner surface which is maintained in contact with a curved outer surface housed in a toothed wheel of said engine;

a first clip, housed in a first end of the curved segment and fastened to a first end of the curved outer surface housed in the toothed wheel and hooking onto a first hook or protrusion which said wheel comprises in a vicinity of said first end of the curved outer surface, said first hook or protrusion being complementary to the first clip so as to be able to cooperate with the first clip; and a second clip, housed in a first end of the curved segment and fastened to a second end of the curved outer surface housed in the toothed wheel and hooking onto a second hook or protrusion which said wheel comprises in a vicinity of said second end of the curved outer surface, said second hook or protrusion being complementary to the second clip so as to be able to cooperate with the second clip.

* * * * *